United States Patent
Takeuchi et al.

(10) Patent No.: US 11,400,682 B2
(45) Date of Patent: Aug. 2, 2022

(54) HYGROSCOPIC PACKAGING CONTAINER

(71) Applicant: Dai Nippon Printing Co., Ltd., Tokyo (JP)

(72) Inventors: Naoya Takeuchi, Tokyo (JP); Taeko Kanamori, Tokyo (JP); Tsutomu Noto, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/021,159

(22) PCT Filed: Sep. 29, 2014

(86) PCT No.: PCT/JP2014/075806
§ 371 (c)(1),
(2) Date: Mar. 10, 2016

(87) PCT Pub. No.: WO2015/046485
PCT Pub. Date: Apr. 2, 2015

(65) Prior Publication Data
US 2016/0221292 A1 Aug. 4, 2016

(30) Foreign Application Priority Data

Sep. 30, 2013 (JP) .............................. JP2013-202943
Sep. 30, 2013 (JP) .............................. JP2013-202944

(51) Int. Cl.
*B32B 1/02* (2006.01)
*B32B 15/085* (2006.01)
(Continued)

(52) U.S. Cl.
CPC .................. *B32B 1/02* (2013.01); *B32B 3/04* (2013.01); *B32B 3/28* (2013.01); *B32B 7/05* (2019.01);
(Continued)

(58) Field of Classification Search
CPC ... B32B 2439/80; B32B 2307/31; B32B 7/06; B32B 2535/00; B32B 2439/06;
(Continued)

(56) References Cited

U.S. PATENT DOCUMENTS 5,820,956 A * 10/1998 Hatakeyama ........... B32B 27/18
428/35.4
2002/0006483 A1 1/2002 Neteler
(Continued)

FOREIGN PATENT DOCUMENTS

JP 2001-253444 9/2001
JP 2002-104514 4/2002
(Continued)

OTHER PUBLICATIONS

International Search Report of PCT/JP2014/075806, dated Dec. 14, 2014, and English translation thereof, 4 pages total.
(Continued)

*Primary Examiner* — Lee E Sanderson
*Assistant Examiner* — Michael C Romanowski
(74) *Attorney, Agent, or Firm* — Hamre, Schumann, Mueller & Larson, P.C.

(57) ABSTRACT

Provided is a hygroscopic packaging container which eliminates the necessity of filling a moisture absorbent and which has satisfactory working efficiency and is highly effective in moisture absorption. The hygroscopic packaging container is obtained from two gas-barrier multilayer films each comprising a gas-barrier layer and a heat-sealable layer, by stacking the gas-barrier multilayer films so that the surface of one of the heat-sealable layers overlies that of the other and heat-sealing the peripheral parts of the layers, at least one heat-sealable layer of the two gas-barrier multilayer films being a hygroscopic heat-sealable layer.

2 Claims, 2 Drawing Sheets

(51) Int. Cl.

| | |
|---|---|
| *B32B 15/09* | (2006.01) |
| *B32B 15/20* | (2006.01) |
| *B32B 27/08* | (2006.01) |
| *B32B 27/32* | (2006.01) |
| *B32B 27/36* | (2006.01) |
| *B32B 7/12* | (2006.01) |
| *B65D 81/18* | (2006.01) |
| *B32B 7/06* | (2019.01) |
| *B32B 3/04* | (2006.01) |
| *B32B 27/18* | (2006.01) |
| *B32B 15/08* | (2006.01) |
| *B32B 7/05* | (2019.01) |
| *B32B 3/28* | (2006.01) |
| *B65D 65/42* | (2006.01) |
| *B65D 81/26* | (2006.01) |

(52) U.S. Cl.
CPC ............... *B32B 7/06* (2013.01); *B32B 7/12* (2013.01); *B32B 15/08* (2013.01); *B32B 15/085* (2013.01); *B32B 15/09* (2013.01); *B32B 15/20* (2013.01); *B32B 27/08* (2013.01); *B32B 27/18* (2013.01); *B32B 27/32* (2013.01); *B32B 27/36* (2013.01); *B65D 81/18* (2013.01); *B32B 2255/10* (2013.01); *B32B 2255/20* (2013.01); *B32B 2255/26* (2013.01); *B32B 2264/102* (2013.01); *B32B 2264/104* (2013.01); *B32B 2264/12* (2013.01); *B32B 2307/31* (2013.01); *B32B 2307/412* (2013.01); *B32B 2307/5825* (2013.01); *B32B 2307/726* (2013.01); *B32B 2307/728* (2013.01); *B32B 2307/7242* (2013.01); *B32B 2307/748* (2013.01); *B32B 2439/46* (2013.01); *B32B 2439/80* (2013.01); *B65D 65/42* (2013.01); *B65D 81/267* (2013.01)

(58) Field of Classification Search
CPC ............ B32B 2439/40; B32B 2439/46; B32B 2439/70; B65D 81/18

USPC ..................................... 428/36.6, 34.1–36.92
See application file for complete search history.

(56) References Cited

U.S. PATENT DOCUMENTS

| | | | |
|---|---|---|---|
| 2004/0219380 A1* | 11/2004 | Naruse et al. | B32B 19/00 428/500 |
| 2007/0111005 A1* | 5/2007 | Oshita | B32B 27/08 428/411.1 |
| 2007/0160789 A1* | 7/2007 | Merical | B32B 7/02 428/35.7 |
| 2011/0266189 A1* | 11/2011 | Tom | B32B 15/08 206/531 |

FOREIGN PATENT DOCUMENTS

| | | |
|---|---|---|
| JP | 2002-347850 | 12/2002 |
| JP | 2003-071975 | 3/2003 |
| JP | 2005-096853 | 4/2005 |
| JP | 2006-213393 | 8/2006 |
| JP | 4138070 | 8/2008 |
| JP | 2009-39905 | 2/2009 |
| JP | 2009-96155 | 5/2009 |
| JP | 2009-297935 | 12/2009 |
| JP | 2009-297936 | 12/2009 |
| JP | 2009-297936 A * | 12/2009 |
| JP | 4422285 | 2/2010 |
| JP | 2012-006651 | 1/2012 |

OTHER PUBLICATIONS

Office Action issued in counterpart Japanese Application No. 2014-198591, dated May 8, 2018, 6 pages with an English translation.
Office Action issued in counterpart Japanese Application No. 2014-198592, dated May 8, 2018, 10 pages with an English translation.

* cited by examiner

HYGROSCOPIC PACKAGING CONTAINER

TECHNICAL FIELD

The present invention relates to a hygroscopic packaging container that absorbs moisture in a packaging container. The invention further relates to a hygroscopic packaging container with a ready release property.

BACKGROUND ART

In packaging containers that enclose moisture-sensitive products such as biosensors, including blood glucose level measuring sensors (glucose sensors or enzyme electrodes), for example, it is a known technique to fill a moisture absorbent such as silica gel together with the product in order to remove internal moisture (PTLs 1 and 2).

However, filling such a moisture absorbent is problematic in that it creates irregularities on the packaging container surface, rendering it prone to tearing. Even without tearing, it can be detrimental to the gas-barrier layer that is provided in the multilayer film forming the packaging container for the purpose of preventing infiltration of water vapor. In addition, irregularities are created by filling of the moisture absorbent, the packaging container increases in bulk, the filling property is reduced during packaging, and transport costs are increased.

Another problem is that the moisture absorbent can become crushed inside the package during transport or storage, and the fragments or powder may attach to the contents such as the blood glucose level measuring sensor, resulting in adverse effects.

Moreover, the number of steps for filling of the moisture absorbent increases, thus reducing working efficiency and increasing production cost.

CITATION LIST

Patent Literature

[PTL 1] Japanese Patent Publication No. 4138070
[PTL 2] Japanese Patent Publication No. 4422285

SUMMARY OF INVENTION

Technical Problem

It is an object of the present invention to provide a packaging container that solves the problems mentioned above, requiring no filling of a moisture absorbent, having satisfactory manageability and exhibiting a high moisture absorption effect.

It is another object of the invention to provide a packaging container that also exhibits a ready release property, in addition to a moisture absorption effect.

Solution to Problem

As a result of much research, the present inventors have found that the aforementioned objects can be achieved by a hygroscopic packaging container which is a packaging container obtained from two gas-barrier multilayer films each comprising at least a gas-barrier layer and a heat-sealable layer, stacking their heat-sealable layer surfaces and heat sealing the peripheral parts, at least one of the heat-sealable layers of the two gas-barrier multilayer films being a hygroscopic heat-sealable layer.

It was further found that the objects can be achieved by a hygroscopic packaging container wherein at least one of the heat-sealable layers of the two gas-barrier multilayer films is a ready-release heat-sealable layer.

The present invention has the following features.

(1) A hygroscopic packaging container which is a packaging container obtained from two gas-barrier multilayer films each comprising at least a gas-barrier layer and a heat-sealable layer, stacking their heat-sealable layer surfaces and heat sealing the peripheral parts, at least one of the heat-sealable layers of the two gas-barrier multilayer films being a hygroscopic heat-sealable layer.

(2) A hygroscopic packaging container according to (1) above, wherein at least one of the heat-sealable layers of the two gas-barrier multilayer films is a ready-release heat-sealable layer.

(3) A hygroscopic packaging container according to (1) or (2) above, wherein the hygroscopic heat-sealable layer comprises a heat sealable resin containing a moisture absorbent.

(4) A hygroscopic packaging container according to (3) above, wherein the moisture absorbent is a chemical moisture absorbent.

(5) A hygroscopic packaging container according to (4) above, which is a packaging container for a blood glucose level measuring sensor.

Advantageous Effects of Invention

In the hygroscopic packaging container of the invention, the innermost layer of the packaging container exhibits a hygroscopic property. It is thus possible to efficiently and rapidly absorb moisture inside the packaging container, and to prevent deterioration of the product by moisture, even without filling a moisture absorbent.

In addition, since a moisture absorbent is not packed, the container is less prone to tearing during transport and storage, the gas-barrier layer is not impaired, and the contents can be stably preserved over prolonged periods.

Furthermore, by elimination of the time required for filling of the moisture absorbent, working efficiency is improved and production cost can be minimized. Moreover, since no moisture absorbent is accommodated, it is possible to obtain a thin packaging container without bulk, and transport costs are also reduced.

In addition, if one of the two multilayer films composing the packaging container of the invention is a ready-release multilayer film, it will be possible to exhibit adequate sealing performance and hygroscopicity while simultaneously exhibiting a satisfactory ready release property.

Therefore, the packaging container exhibiting hygroscopicity and a ready release property according to the invention is particularly suitable for packaging of a blood glucose level measuring sensor in the form of a disposable enzyme electrode to be used for monitoring of blood glucose levels by self blood sampling when, for example, insulin is to be administered to a diabetes patient.

DESCRIPTION OF EMBODIMENTS

The invention will now be explained in greater detail.
<Multilayer Structure of Hygroscopic Packaging Container of the Invention>

Figure 1:
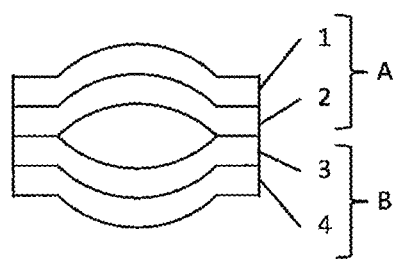
FIG. 1 is a schematic cross-sectional diagram showing an example of the multilayer structure of a hygroscopic multilayer film composing a hygroscopic packaging container of the invention.

FIG. 1 is a schematic cross-sectional diagram showing an example of the multilayer structure of a packaging container of the invention that is hygroscopic and has a ready-release property. As shown in FIG. 1, the packaging container of the invention is obtained by stacking a hygroscopic multilayer film A having a gas-barrier layer 1 and a hygroscopic heat-sealable layer 2, and a ready-release multilayer film B having a ready-release heat-sealable layer 3 and a gas-barrier layer 4, in such a manner that the hygroscopic heat-sealable layer 2 side and the ready-release heat-sealable layer 3 side are facing each other, and heat sealing the peripheral parts.

The hygroscopic heat-sealable layer 2 is a layer that is hygroscopic and heat sealable, and it may have a monolayer structure or a multilayer structure.

When it has a monolayer structure, the hygroscopic heat-sealable layer is a layer comprising a heat sealable resin containing a moisture absorbent.

When it has a multilayer structure, the hygroscopic heat-sealable layer has at least a layer comprising a resin composition containing a moisture absorbent and a binder resin, and a layer comprising a heat sealable resin. The binder resin may be a heat sealable resin, and the layer comprising the heat sealable resin may include a moisture absorbent.

For example, when the hygroscopic heat-sealable layer has a two-layer structure, one of the two layers, for example, the layer on the side that is to be the innermost layer of the packaging container, may comprise a heat sealable resin containing a moisture absorbent, and the other layer on the side facing the gas-barrier layer may comprise a heat sealable resin that does not contain a moisture absorbent.

If the layer on the side facing the gas-barrier layer does not contain a moisture absorbent, it will be possible to increase the bonding strength between layers. Conversely, the layer on the side that is to be the innermost layer of the packaging container may comprise a heat sealable resin that does not contain a moisture absorbent, and the layer on the side facing the gas-barrier layer may comprise a heat sealable resin containing a moisture absorbent. Such a structure can increase the seal strength of the packaging container.

Figure 2:
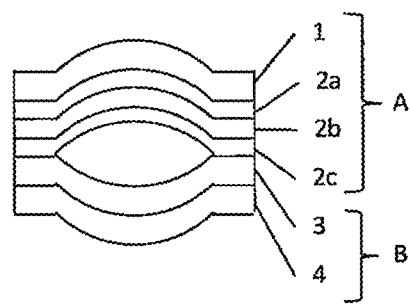
FIG. 2 is a schematic cross-sectional diagram showing another example of the multilayer structure of a hygroscopic multilayer film composing a hygroscopic packaging container of the invention.

As yet a different mode, the hygroscopic heat-sealable layer may have a three-layer structure as shown in FIG. 2. In this case, the three-layer structure having the layers: heat sealable resin layer not containing a moisture absorbent 2a/intermediate layer comprising a resin composition containing a moisture absorbent and a binder resin 2b/heat sealable resin layer not containing a moisture absorbent 2c, can increase the seal strength and interlayer bonding strength.

Figure 3:
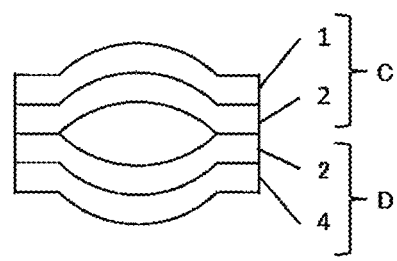
FIG. 3 is a schematic cross-sectional diagram showing yet another example of the multilayer structure of a hygroscopic multilayer film composing a hygroscopic packaging container of the invention.

FIG. 3 is a schematic cross-sectional diagram showing another example of the multilayer structure of a hygroscopic packaging container of the invention. As shown in FIG. 3, the packaging container of the invention is obtained by stacking two gas-barrier multilayer films C, D each having gas-barrier layers 1, 4 and a heat-sealable layer 2, with their heat-sealable layers 2 facing each other, and heat sealing their peripheral parts. The heat-sealable layer 2 of at least one of the two gas-barrier multilayer films C is a hygroscopic heat-sealable layer exhibiting a hygroscopic property. The hygroscopic or non-hygroscopic heat-sealable layer 2 may have a monolayer structure or a multilayer structure.

When the hygroscopic heat-sealable layer 2 has a monolayer structure, the hygroscopic heat-sealable layer 2 is a layer comprising a heat sealable resin containing a moisture absorbent.

When the heat-sealable layer 2 exhibiting a hygroscopic property has a multilayer structure, the hygroscopic heat-sealable layer 2 has at least a layer comprising a resin composition containing a moisture absorbent and a binder resin, and a layer comprising a heat sealable resin. The binder resin may be a heat sealable resin, and the layer comprising the heat sealable resin may include a moisture absorbent.

For example, when the hygroscopic heat-sealable layer 2 has a two-layer structure, one of the two layers, for example, the layer on the side that is to be the innermost layer of the packaging container, may comprise a heat sealable resin containing a moisture absorbent, and the other layer on the side facing the gas-barrier layer may comprise a heat sealable resin that does not contain a moisture absorbent.

If the layer on the side facing the gas-barrier layer does not contain a moisture absorbent, it will be possible to increase the bonding strength between layers. Conversely, the layer on the side that is to be the innermost layer of the packaging container may comprise a heat sealable resin that does not contain a moisture absorbent, and the layer on the side facing the gas-barrier layer may comprise a heat sealable resin containing a moisture absorbent. Such a structure can increase the seal strength of the packaging container.

Figure 4:
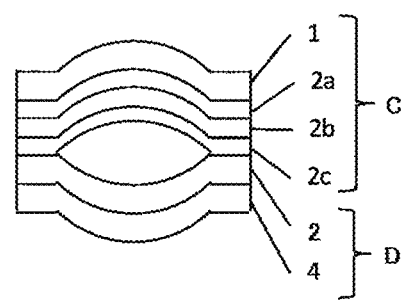
FIG. 4 is a schematic cross-sectional diagram showing yet another example of the multilayer structure of a hygroscopic multilayer film composing a hygroscopic packaging container of the invention.

As yet a different mode, the hygroscopic heat-sealable layer 2 may have a three-layer structure as shown in FIG. 4. In this case, the three-layer structure having the layers: heat sealable resin layer not containing a moisture absorbent 2a/intermediate layer comprising a resin composition containing a moisture absorbent and a binder resin 2b/heat sealable resin layer not containing a moisture absorbent 2c, can increase the seal strength and interlayer bonding strength, and is therefore preferred.

<Gas-Barrier Layer>

According to the invention, the gas-barrier layer in the gas-barrier multilayer film is not particularly restricted, and comprises a publicly known or commercially available gas barrier film having a barrier property against oxygen gas or water vapor.

Specific examples of gas barrier films that may be suitably used for the invention include resin films made of resins such as polyethylene terephthalate (PET), polybutylene terephthalate, polyethylene naphthalate, polyamide, polyimide, polyvinyl alcohol, ethylene-vinyl alcohol copolymer and the like.

Also, as an optional base film, for example, there may be mentioned a vapor deposition film provided with a vapor deposition film such as a silica vapor deposition film or alumina vapor deposition film on at least one side of a film made of any of various resins such as a polyethylene-based resin, polypropylene-based resin, cyclic polyolefin-based resin, fluorine-based resin, polystyrene-based resin, acrylonitrile-styrene copolymer (AS resin), acrylonitrile-butadiene-styrene copolymer (ABS resin), polyvinyl chloride-based resin, fluorine-based resin, poly(meth)acrylic-based resin, polycarbonate-based resin, a polyester-based resin such as PET or polyethylene naphthalate resin, a polyamide-based resin such as various types of nylon, or a polyimide-based resin, polyamideimide-based resin, polyaryl phthalate-based resin, silicone-based resin, polysulfone-based resin, polyphenylene sulfide-based resin, polyethersulfone-based resin, polyurethane-based resin, acetal-based resin, cellulosic resin or the like.

In addition, while a multilayer film having a metal foil such as an aluminum foil laminated on the base film may be used, there is no limitation to such a mode.

Among such films, it is preferred to use a silica vapor deposition film, alumina vapor deposition film, aluminum foil-laminated multilayer film or the like, from the viewpoint of the gas barrier property. Furthermore, by using an aluminum foil in particular it is possible to impart a light-shielding property, to allow suitable use even as a packaging container for products that are prone to degradation by photoirradiation.

As a preferred mode, at least one of the two gas-barrier multilayer films composing the packaging container of the invention has a visibility property.

More preferably, one of the two gas-barrier multilayer films composing the packaging container is a non-transparent hygroscopic gas-barrier multilayer film C having a non-transparent gas-barrier layer 1 and a hygroscopic heat-sealable layer 2, while the other is a transparent non-hygroscopic gas-barrier multilayer film D having a transparent gas-barrier layer 4 and a non-hygroscopic heat-sealable layer 2.

Such a structure is particularly suitable for use as a packaging container for a product when it is desirable to confirm the state and orientation of the contents from outside the packaging container before opening, such as a packaging container for a blood glucose level measuring sensor.

As the transparent gas-barrier layer it is preferred to use a silica vapor deposition film, for example, and IB-PET-RB (product of DaiNippon Printing Co., Ltd.) may be suitably used.

Also, a gas-barrier coated film such as described below may be provided on the vapor deposition film. This will allow an even more excellent gas barrier property to be obtained.

According to the invention, a gas-barrier coated film is a film that is obtained by coating and drying a gas barrier composition obtained by hydrolysis and polycondensation of an alkoxide and a water-soluble polymer, by a sol-gel method, in the presence of a sol-gel catalyst, an acid, water and an organic solvent. The gas barrier composition may further contain a silane coupling agent, depending on the case.

The alkoxide that may be used for the gas barrier composition is preferably at least one type of alkoxide represented by the general formula $R^1{}_nM(OR^2)_m$ (where $R^1$ and $R^2$ each represent a C1-8 organic group, M represents a metal atom, n represents an integer of 0 or greater, m represents an integer of 1 or greater, and n+m represents the valency of M). The metal atom M may be silicon, zirconium, titanium, aluminum or another metal. Specific examples for the organic groups represented by $R^1$ and $R^2$ include alkyl groups such as methyl, ethyl, n-propyl, i-propyl, n-butyl and i-butyl. These alkyl groups may be the same or different in the same molecule. Examples of such alkoxides include tetramethoxysilane $Si(OCH_3)_4$, tetraethoxysilane $Si(OC_2H_5)_4$, tetrapropoxysilane $Si(OC_3H_7)_4$ and tetrabutoxysilane $Si(OC_4H_9)_4$.

Also, water-soluble polymers that may be used in the gas barrier composition are preferably polyvinyl alcohol-based resins or ethylene-vinyl alcohol copolymers, or both.

The sol-gel catalyst may be a tertiary amine that is essentially insoluble in water and soluble in organic solvents, and particularly it may be N,N-dimethylbenzylamine. Examples for acids to be used in the gas barrier composition include mineral acids such as sulfuric acid, hydrochloric acid and nitric acid, and organic acids such as acetic acid and tartaric acid, and the like. Examples of organic solvents that may be used include methyl alcohol, ethyl alcohol, isopropyl alcohol and n-propyl alcohol.

The content of the water-soluble polymer in the gas barrier composition is preferably in the range of 5 to 500 parts by mass with respect to 100 parts by mass as the total alkoxide. If the content exceeds 500 parts by mass, the brittleness of the formed gas-barrier coated film will increase and the weather resistance and other properties will be reduced, which is undesirable.

The gas barrier composition is coated on the vapor deposition film and heated to remove the solvent and the alcohol produced by polycondensation reaction, thereby completing the polycondensation reaction and forming a transparent gas-barrier coated film. Contact bondability between the vapor deposition film and gas-barrier coated film is satisfactory due to bonding between the hydroxyl groups produced by hydrolysis or silanol groups from the silane coupling agent, with hydroxyl groups on the surface of the vapor deposition film.

The gas-barrier coated film may be a compound polymer layer obtained by overlaying one or more layers. Also, the thickness, as the dry film thickness, may be 0.01 to 30 μm and preferably 0.1 to 10 μm.

<Heat-Sealable Layer>

In one of the two gas-barrier multilayer films composing the packaging container of the invention, the heat-sealable layer is a hygroscopic heat-sealable layer exhibiting a hygroscopic property, while the other heat-sealable layer may exhibit a hygroscopic property or it may be non-hygroscopic.

In the case of a packaging container where it is desirable to confirm the state and orientation of the contents from outside the packaging container, as with a packaging container for a blood glucose level measuring sensor, the other heat-sealable layer may be non-hygroscopic, and is preferably highly transparent.

<Hygroscopic Heat-Sealable Layer>

According to the invention, the moisture absorbent in the hygroscopic heat-sealable layer is not particularly restricted, and there may be used a publicly known or commercially available material having an absolute drying effect or humidifying effect. An absolute drying effect is an effect of absorbing moisture to a relative humidity of near 0%, while a humidifying effect is an effect of absorbing moisture when the humidity is high and releasing moisture when the humidity is low, to maintain a constant humidity.

According to the invention, examples of substances that may be suitably used as moisture absorbents include silica gel, alumina gel, silica-alumina gel, anhydrous magnesium sulfate, zeolite, synthetic zeolite, calcium oxide, calcium chloride and dried alum, as well as mixtures thereof, although there is no limitation to these.

For use as a packaging container for a blood glucose level measuring sensor, it is preferred to use a chemical moisture absorbent having an absolute drying effect, such as calcium oxide or magnesium sulfate in particular, from the viewpoint of preventing release of moisture that has already been absorbed, and of stability over time in a state of low humidity in the packaging container. Moreover, by using a chemical moisture absorbent having an absolute drying effect, it is possible, for example, to maintain a low value for the humidity in a pouch bag even after an elapse of 7 days, as shown in Table 1 and Table 2.

Furthermore, by using such a chemical moisture absorbent it is possible to reduce the amount of addition compared to using a physical moisture absorbent, and in some cases the hygroscopic heat-sealable layer can have a monolayer structure.

According to the invention, the binder resin mixed with the moisture absorbent is not particularly restricted so long as it can stably retain the moisture absorbent, and any desired resin may be used. It is particularly preferred to use a heat sealable resin.

There are no particular restrictions on the heat sealable resin, and any publicly known or commercially available polyolefin-based resin having a heat sealing property may be used.

Such polyolefin-based resins include polyethylenes such as low-density polyethylene, medium-density polyethylene, high-density polyethylene and straight-chain (linear) low-density polyethylene (LLDPE), polypropylene, ethylene-vinyl acetate copolymer, ethylene-ethyl acrylate copolymer, ethylene-acrylic acid copolymer, ethylene-methacrylic acid copolymer, ethylene-methyl methacrylate copolymer, ethylene-propylene copolymer, methylpentene polymer, acid-modified polyolefin-based resins, and mixtures of these resins, with no limitation to these resins. Also, small amounts of an antioxidant, anti-blocking agent or the like may be employed as an additive.

Particularly, in order to exhibit an excellent heat seal property and hygroscopic property while containing a moisture absorbent, it is preferred to use low-density polyethylene, LLDPE, polypropylene or the like.

The amount of moisture absorbent added to the hygroscopic heat-sealable layer can exhibit a moisture absorption effect if it is present at 1 mass % or greater with respect to the total mass of the layer to which the moisture absorbent has been added in the hygroscopic heat-sealable layer, i.e. with respect to the total mass of the moisture absorbent-added layer, and it is preferably present at 3 mass % or greater in order to obtain a satisfactory moisture absorption effect. On the other hand, the amount of moisture absorbent added must be less than 55 mass % in order to obtain satisfactory film formability.

The amount of moisture absorbent added is 1 mass % to 50 mass %, preferably 3 mass % to 50 mass % and even more preferably 15 mass % to 50 mass %, with respect to the total mass of the moisture absorbent-added layer of the hygroscopic heat-sealable layer.

According to another mode, the hygroscopic heat-sealable layer may be a layer made of a hygroscopic resin such as nylon or ethylene-vinyl acetate copolymer. A moisture absorbent may also be added to such a hygroscopic resin, in which case the amount of addition is 1 mass % to 50 mass %, preferably 3 mass % to 50 mass % and even more preferably 15 mass % to 50 mass %, with respect to the total mass of the hygroscopic heat-sealable layer.

If the thickness of the hygroscopic heat-sealable layer is at least 5 μm it will be possible to form a film, but it is preferably 10 to 200 μm in order to obtain satisfactory film formability and hygroscopicity.

According to one mode of the invention, the hygroscopic heat-sealable layer has a monolayer structure composed of a resin composition obtained by kneading a moisture absorbent in a heat sealable resin.

According to another mode, the hygroscopic heat-sealable layer has a multilayer structure with two or more layers, each layer being composed of a resin composition each with a different amount of addition of the moisture absorbent. The structure may also include a layer consisting only of a heat sealable resin without a moisture absorbent.

The moisture absorbent may be evenly dispersed in the layers. Also, for example, it may be dispersed with an increasing concentration gradient from the surface of the innermost layer side toward the surface facing the gas-barrier layer, as such a construction will improve the heat seal property. Conversely, it may be dispersed with a decreasing concentration gradient from the surface of the innermost layer side toward the surface facing the gas-barrier layer, as such a construction will improve the interlayer bonding strength.

For example, in a hygroscopic packaging bag comprising the structure: LDPE layer/hygroscopic heat-sealable layer (1)/hygroscopic heat-sealable layer (2), the amount of moisture absorbent added may be greater in the hygroscopic heat-sealable layer (1) than in the hygroscopic heat-sealable layer (2), or instead it may be less, as appropriately selected according to the purpose of use.

The method for kneading the moisture absorbent in the heat sealable resin or binder resin may be a publicly known or commonly employed kneading method. For example, the moisture absorbent may be dispersed in the heat sealable resin or the binder resin to prepare a pellet-like master batch, and the batch dispersed again in a heat sealable resin or binder resin, as a "master batch blending method", thereby allowing uniform dispersion even for readily aggregating moisture absorbents.

<Non-Hygroscopic Heat-Sealable Layer>

According to the invention, when one heat-sealable layer of the two gas-barrier multilayer films composing the packaging container is a non-hygroscopic heat-sealable layer that does not exhibit hygroscopicity, the resin composing that layer is not particularly restricted so long as it has a heat seal property, and a publicly known or commercially available polyolefin-based resin with a heat seal property may be used.

Examples of resins that may be used include polyethylenes such as low-density polyethylene, medium-density polyethylene, high-density polyethylene and straight-chain (linear) low-density polyethylene, 1-butene, 1-pentene, 1-hexene, 1-octene, polypropylene, propylene elastomer, ethylene-vinyl acetate copolymer, ethylene-ethyl acrylate copolymer, ethylene-acrylic acid copolymer, ethylene-methacrylic acid copolymer, ethylene-methyl methacrylate copolymer, ethylene-propylene copolymer, methylpentene polymer, acid-modified polyolefin-based resins and the like, with no limitation to these resins.

<Multilayer Film>

By laying the aforementioned heat-sealable layer on the gas barrier film composing the gas-barrier layer, it is possible to obtain a gas-barrier multilayer film that is to form the packaging container of the invention.

According to the invention, the layering method is not particularly restricted, and the resin or resin composition that is to form the heat-sealable layer may be layered by extrusion coating on the gas barrier film, via a bonding layer depending on the case.

For extrusion coating, first the resin or resin composition is heated to melting and spread out in the necessary widthwise direction with a T-die for extrusion into a curtain, the molten resin is allowed to flow over a gas barrier film and sandwiched between a rubber roll and a cooled metal roll, for simultaneous formation of a heat-sealable layer and bonding and layering with the gas barrier film.

The bonding layer may be made of any desired anchor coating agent, and for example, an organic titanium-based, isocyanate-based, polyethyleneimine-based, acid-modified polyethylene-based or polybutadiene-based anchor coat agent may be used.

Also a film made of the resin or resin composition may be formed, and laminated with the gas barrier film via a bonding layer, by dry lamination, non-solvent lamination, sand lamination or the like.

The method of forming the film in this case may be a publicly known or commonly used film forming method, and for example, when an inflation method is used as the film forming method, the melt flow rate (MFR) of the heat sealable resin or binder resin forming the heat-sealable layer is preferably 0.2 to 5.0 g/10 min and more preferably 0.2 to 4.0 g/10 min. An MFR of less than 0.2 g/10 min or of 5.0 g/10 min or greater is not effective from the viewpoint of suitability for working.

Throughout the present specification, the MFR is the value measured by a method according to JIS K7210.

According to one mode of the invention, the bonding layer may be a layer of a dry laminating bonding agent, a non-solvent laminating bonding agent or the like.

When a dry laminating bonding agent is to be used as the bonding layer, a bonding agent dispersed or dissolved in a solvent is coated and dried onto one film, while the other film is layered over it, after which it is aged at 30 to 120° C. for from several hours to several days, to harden the bonding agent and form a layering.

When a non-solvent laminating bonding agent is to be used, the bonding agent itself, without being dispersed or dissolved in a solvent, is coated and dried onto one film, while the other film is layered over it, after which it is aged at 30 to 120° C. for from several hours to several days, to harden the bonding agent and form a layering.

These bonding agents may be thermosetting, ultraviolet curing, electron beam curable, or the like.

Such bonding agents may be polyvinyl acetate-based bonding agents such as polyvinyl acetate or vinyl-ethylene acetate copolymers, polyacrylic acid-based bonding agents composed of a copolymer of polyacrylic acid with polystyrene, polyester, polyvinyl acetate or the like, cyano acrylate-based bonding agents, ethylene copolymer-based bonding agents composed of a copolymer of ethylene with a monomer such as vinyl acetate, ethyl acrylate, acrylic acid or methacrylic acid, cellulosic bonding agents, polyurethane-based bonding agents, polyester-based bonding agents, polyamide-based bonding agents, polyimide-based bonding agents, polyolefin-based bonding agents, amino resin-based bonding agents composed of urea resins, melamine resins or the like, phenol resin-based bonding agents, epoxy-based bonding agents, reactive (meth)acrylic-based bonding agents, elastomeric bonding agents made of chloroprene rubber, nitrile rubber, styrene-butadiene rubber or the like, silicone-based bonding agents, and inorganic bonding agents composed of alkali metal silicates, low-melting-point glass or the like.

The bonding agent may be in aqueous, solution, emulsion or dispersion form, and with the character of a film, sheet, powder, solid or the like, and the bonding mechanism may be by chemical reaction, solvent volatilization, heat-fusion, thermocompression, or the like.

The bonding layer is formed by applying the bonding agent by roll coating, gravure roll coating, kiss coating or the like, the coating coverage being preferably about 0.1 to 10 g/m$^2$ (dry state). If the coating coverage of the bonding agent is within this range it will be possible to obtain satisfactory adhesion.

According to another mode of the invention, the gas barrier film and the film that is to form the hygroscopic heat-sealable layer may be layered by sand lamination. In this case, for the bonding layer there may be used any desired resin that can be hot melted and applied with an extruder. Specifically, the resins mentioned above as heat sealable resins are suitable for use.

According to the invention, the hygroscopic multilayer film may have another layer in addition to the gas-barrier layer and hygroscopic heat-sealable layer.

<Ready-Release Heat-Sealable Layer>

According to the invention, the ready-release heat-sealable layer comprises a resin composition containing a heat sealable resin that is compatible and a heat sealable resin that is non-compatible with the heat sealable resin that forms the hygroscopic or non-hygroscopic heat-sealable layer facing it. A layer composed of such a resin composition has a "sea-island structure" wherein a resin with a high component ratio forms the sea portions and a resin with a low component ratio forms the island portions. Domains composed of the resin forming the island portions are dispersed in the resin phase forming the sea portions.

For example, when the heat sealable resin composing the facing heat-sealable layer is a polyethylene resin, the ready-release heat-sealable layer may be composed of a resin composition containing a polyethylene resin and a heat sealable resin that is non-compatible with it, such as polypropylene, polystyrene or polybutene.

According to another mode, when the heat sealable resin composing the facing heat-sealable layer is a polypropylene resin, the ready-release heat-sealable layer may be composed of a resin composition containing a polypropylene resin and a heat sealable resin that is non-compatible with it, for example, polyethylene resin, ethylene-vinyl acetate copolymer, ethylene-methacrylic acid copolymer or the like.

According to yet another mode, when the heat sealable resin composing the facing heat-sealable layer is an ethylene-vinyl acetate copolymer, the ready-release heat-sealable layer may be composed of a resin composition containing ethylene-vinyl acetate copolymer or a heat sealable resin that is compatible with it, for example, a polyethylene resin or the like, and a heat sealable resin that is non-compatible with it, such as polypropylene, polybutene-1 or the like.

According to the invention, the resin suitable for use to form the resin composition may be a publicly known or commercially available heat sealable resin, and for example, there may be selected a compatible or non-compatible resin from among the aforementioned polyethylene (low-density polyethylene, medium-density polyethylene, high-density polyethylene, linear low-density polyethylene), polypropylene, polybutene, ethylene-vinyl acetate copolymers and ethylene-methacrylic acid copolymers, as well as ethylene-methyl methacrylate copolymers, ethylene-acrylic acid copolymers, ethylene-ethyl acrylate copolymers, ethylene-propylene copolymers and their derivatives, such as acid-modified derivatives, depending on the structure of the facing heat-sealable layer, with there being no limitation to those mentioned here.

In order for the packaging container of the invention to exhibit desired peel strength suited for packaging use, the mixing ratio of the compatible resin and the non-compatible resin in the resin composition may be adjusted, and for example, the compatible resin/non-compatible resin ratio may be a mass ratio of 50/50 to 99/1, preferably a mass ratio of 70/30 to 97/3 and more preferably a mass ratio of 70/30 to 90/10.

The ready-release heat-sealable layer used may be a commercially available readily-release heat seal film. For example, when the heat sealable resin composing the facing heat-sealable layer is a polyethylene-based resin, it is suitable to use, for example, SMX-Y03, SMX-Y04 or IMX (J-Film Corporation), which are made of resin compositions containing polyethylene, polypropylene and polystyrene.

According to the invention, a film can be formed so long as the thickness of the ready-release heat-sealable layer is 3 µm or greater, but it is preferably 5 to 200 µm in order to obtain satisfactory film formability and hygroscopicity.

<Ready-Release Multilayer Film>

By laying the aforementioned ready-release heat-sealable layer on the gas barrier film composing the gas-barrier layer, it is possible to obtain a ready-release multilayer film.

According to the invention, the layering method is not particularly restricted, and may be lamination by extrusion coating similar to the hygroscopic multilayer film described above, or lamination by dry lamination, non-solvent lamination, sand lamination or the like.

Also, the ready-release multilayer film may have another layer in addition to the gas-barrier layer and the ready-release heat-sealable layer. For example, it may have the aforementioned hygroscopic heat-sealable layer between the gas-barrier layer and the ready-release heat-sealable layer. Alternatively, the ready-release heat-sealable layer may include the aforementioned moisture absorbent to be provided with both a ready-release property and hygroscopicity. When it is desired for the ready-release heat-sealable layer to exhibit hygroscopicity, the amount of addition is 1 mass % to 50 mass %, preferably 3 mass % to 50 mass % and even more preferably 15 mass % to 50 mass %, with respect to the total mass of the moisture absorbent-added layer.

<Packaging Container>

The packaging container of the invention is prepared as a pouch from two of the gas-barrier multilayer films, and can be produced by stacking the two multilayer films so that the heat-sealable layer surfaces are facing each other, and heat sealing the peripheral parts.

The heat-sealable layer of at least one of the two gas-barrier multilayer films is a hygroscopic heat-sealable layer.

Also, the heat-sealable layer of at least one of the two gas-barrier multilayer films may be the aforementioned ready-release heat-sealable layer.

For example, one of the two films may be a hygroscopic multilayer film having a hygroscopic heat-sealable layer, and the other may be a ready-release multilayer film having a ready-release heat-sealable layer. Alternatively, one of the two films may be a hygroscopic ready-release multilayer film and the other may be an ordinary gas-barrier multilayer film exhibiting neither of the properties.

According to the invention, the method of heat sealing may be a publicly known method such as, for example, bar sealing, revolving roll sealing, belt sealing, impulse sealing, high-frequency sealing or ultrasonic sealing.

EXAMPLES

First, there will be described examples of hygroscopic packaging containers obtained by stacking a hygroscopic multilayer film having at least a gas-barrier layer and a hygroscopic heat-sealable layer, and a ready-release multilayer film having at least a gas-barrier layer and a ready-release heat-sealable layer, in such a manner that the hygroscopic heat-sealable layer side and the ready-release heat-sealable layer side are facing each other, and heat sealing the peripheral parts to obtain a hygroscopic packaging container, as well as their comparative examples and evaluation results.

Example 1

A hygroscopic resin composition containing 35 mass % calcium oxide in a polyethylene resin (PERICON, product of Dainichiseika Color & Chemicals Mfg. Co., Ltd.), and LLDPE (ULTZEX 2022F, product of Prime Polymer Co., Ltd.) were co-extruded by an inflation method (extrusion temperature: 180° C.) to form a film, producing a hygroscopic heat sealable resin film with the structure: 10 µm LLDPE layer/60 µm hygroscopic resin composition layer (35 mass % calcium oxide)/10 µm LLDPE layer.

The obtained film was attached to a PET film (thickness: 12 µm, ESPET T4102, product of Toyobo, Ltd.) and aluminum foil (thickness: 9 µm, product of Toyo Aluminium, KK.) through a dry laminating bonding agent (RU004/H-1, product of Rock Paint Co., coating amount: 3.5 g/m$^2$ for each bonding layer, drying temperature: 70° C.), to produce a hygroscopic multilayer film having the multilayer structure: PET film/bonding agent/aluminum foil/bonding agent/hygroscopic heat sealable resin film.

Separately, a PET film (thickness: 12 µm, ESPET T4102, product of Toyobo, Ltd.), an aluminum foil (thickness: 9 µm, product of Toyo Aluminium, KK.) and a ready-release heat sealable resin film (SMX-Y04, product of J-Film Corporation) were attached through a dry laminating bonding agent (RU004/H-1, product of Rock Paint Co., coating amount: 3.5 g/m$^2$ for each bonding layer, drying temperature: 70° C.), to produce a ready-release multilayer film having the multilayer structure: PET film/bonding agent/aluminum foil/bonding agent/ready-release heat sealable resin layer.

The obtained hygroscopic multilayer film and ready-release multilayer film were stacked with the hygroscopic heat sealable resin film side and the ready-release heat sealable resin film side facing each other, and the peripheral edges were heat sealed under conditions of 160° C., 1 kgf/cm$^2$, 1 second, to produce a hygroscopic ready-release packaging container of the invention.

Example 2

A hygroscopic ready-release packaging container of the invention was produced in the same manner as Example 1, except that the hygroscopic heat sealable resin film used was DryKeep® SPES30-132J by Sasaki Chemical Co., Ltd.

Example 3

A hygroscopic ready-release packaging container of the invention was produced in the same manner as Example 1, except that as the gas-barrier layer in the ready-release multilayer film, instead of a gas barrier film obtained by attaching an aluminum foil to a PET film, there was used a gas barrier film (IB-PET-RB, product of DaiNippon Printing Co., Ltd.) having a silicon oxide vapor deposition film (thickness: 10 nm) formed on a PET film (thickness: 12 µm) by chemical vapor deposition, with a gas-barrier coated film (thickness: 200 nm) further formed thereon, as a ready-release multilayer film having the multilayer structure: gas-barrier coated film/vapor deposition film/PET film/bonding agent/ready-release heat sealable resin film.

Example 4

A hygroscopic ready-release packaging container of the invention was produced in the same manner as Example 1, except that as the gas-barrier layers in the ready-release multilayer film and the hygroscopic multilayer film, instead of a gas barrier film obtained by attaching an aluminum foil to a PET film, there were used gas barrier films (IB-PET-RB, product of DaiNippon Printing Co., Ltd.) having a silicon oxide vapor deposition film (thickness: 10 nm) formed on a PET film (thickness: 12 μm) by chemical vapor deposition, with a gas-barrier coated film (thickness: 200 nm) further formed thereon, producing a multilayer film having the multilayer structures: gas-barrier coated film/vapor deposition film/PET film/bonding agent/ready-release heat sealable resin film, and gas-barrier coated film/vapor deposition film/PET film/bonding agent/hygroscopic heat sealable resin film.

Example 5

A hygroscopic ready-release packaging container of the invention was produced in the same manner as Example 1, except that as the ready-release multilayer film, the hygroscopic heat sealable resin film produced in Example 1 was layered between aluminum foil and a ready-release heat sealable resin film via a dry laminating bonding agent, producing a ready-release multilayer film having the multilayer structure: PET film/bonding agent/aluminum foil/bonding agent/hygroscopic heat sealable resin film/bonding agent/ready-release heat sealable resin film.

Example 6

A hygroscopic ready-release packaging container of the invention was produced in the same manner as Example 4, except that as the ready-release multilayer film, the hygroscopic heat sealable resin film produced in Example 1 was layered between a PET film and a ready-release heat sealable resin film via a dry laminating bonding agent, producing a ready-release multilayer film having the multilayer structure: gas-barrier coated film/vapor deposition film/PET film/bonding agent/hygroscopic heat sealable resin film/ready-release heat sealable resin film.

Example 7

A hygroscopic ready-release packaging container of the invention was produced in the same manner as Example 1, except that the hygroscopic heat sealable resin film used was DryKeep® SPES30-111J by Sasaki Chemical Co., Ltd.

Example 8

A hygroscopic ready-release packaging container of the invention was produced in the same manner as Example 3, except that DryKeep® (SPES30-132J, product of Sasaki Chemical Co., Ltd., film thickness: 60 μm) was used as the hygroscopic heat sealable resin film of the hygroscopic multilayer film, and IMX (product of J-Film Corporation) was used as the ready-release heat sealable resin film of the ready-release multilayer film.

Example 9

A hygroscopic packaging container of the invention was produced in the same manner as Example 1, except that a hygroscopic resin composition containing 50 mass % calcium oxide in a polyethylene resin (PERICON, product of Dainichiseika Color & Chemicals Mfg. Co., Ltd.), and LLDPE (ULTZEX 2022F, product of Prime Polymer Co., Ltd.) were co-extruded by an inflation method (extrusion temperature: 180° C.) to form a film, producing a hygroscopic heat sealable resin film with the structure: 10 μm LLDPE layer/30 μm hygroscopic resin composition layer (50 mass % calcium oxide)/10 μm LLDPE layer.

Example 10

A hygroscopic packaging container of the invention was produced in the same manner as Example 1, except that a hygroscopic resin composition containing 15 mass % calcium oxide in a polyethylene resin (PERICON, product of Dainichiseika Color & Chemicals Mfg. Co., Ltd.), and LLDPE (ULTZEX 2022F, product of Prime Polymer Co., Ltd.) were co-extruded by an inflation method (extrusion temperature: 180° C.) to form a film, producing a hygroscopic heat sealable resin film with the structure: 10 μm LLDPE layer/30 μm hygroscopic resin composition layer (15 mass % calcium oxide)/10 μm LLDPE layer.

Example 11

A hygroscopic packaging container of the invention was produced in the same manner as Example 1, except that a hygroscopic resin composition containing 35 mass % calcium oxide in a polyethylene resin (PERICON, product of Dainichiseika Color & Chemicals Mfg. Co., Ltd.), and LLDPE (ULTZEX 2022F, product of Prime Polymer Co., Ltd.) were co-extruded by an inflation method (extrusion temperature: 180° C.) to form a film, producing a hygroscopic heat sealable resin film with the structure: 10 μm LLDPE layer/30 μm hygroscopic resin composition layer (35 mass % calcium oxide)/10 μm LLDPE layer.

Comparative Example 1

A multilayer film and packaging container were produced in the same manner as Example 1, except that the hygroscopic layer of the hygroscopic multilayer film was a heat-sealable layer (thickness: 50 μm) composed of LLDPE (ULTZEX 2022F, product of Prime Polymer Co., Ltd.) containing no moisture absorbent, and the ready-release heat sealable resin layer of the ready-release multilayer film was a heat-sealable layer (thickness: 50 μm) consisting only of LLDPE (ULTZEX 2022F, product of Prime Polymer Co., Ltd.).

<Hygroscopic Effect>

Pouch bags (120 mm×160 mm) were formed from the multilayer films prepared in Examples 1 to 11 and Comparative Example 1, an absorption hygrometer was placed in each pouch, and the relative humidity was measured after standing for 7 days. The evaluation results are shown in Table 1.

<Ready Release Property Test>

The hygroscopic multilayer films and ready-release multilayer films prepared in the examples and comparative examples were each cut into 10 cm×10 cm pieces and stacked so that the heat sealing surface sides were facing each other, and a heat seal tester (TP-701-A, product of Tester Sangyo Co., Ltd.) was used to prepare samples with 1 cm×10 cm regions heat sealed under conditions of 160° C., 1 kgf/cm², 1 second (the edges being left unbonded without heat sealing, and therefore bifurcated. Each sample was cut into a 1.5 cm-wide strip and the bifurcated edges were set in a tensile tester for measurement of the tensile strength (N/15 mm) in a test under conditions with a test speed of 300 mm/min and a load range of 50N. The evaluation results are shown in Table 1.

TABLE 1

| | Evaluation results | | |
|---|---|---|---|
| | Heat sealing property | Relative humidity change | |
| | (N/15 mm) | Initial | After 7 days |
| Example 1 | 6.9 | 60% | ≤5% |
| Example 2 | 7.6 | 60% | ≤5% |
| Example 3 | 7.3 | 60% | ≤5% |
| Example 4 | 7.3 | 60% | ≤5% |
| Example 5 | 7.2 | 60% | ≤5% |
| Example 6 | 7.3 | 60% | ≤5% |
| Example 7 | 7.5 | 60% | ≤5% |
| Example 8 | 7.2 | 60% | ≤5% |
| Example 9 | 6.5 | 60% | ≤5% |
| Example 10 | 7.7 | 60% | 10-20% |
| Example 11 | 7.1 | 60% | ≤5% |
| Comp. Example 1 | 55 | 60% | 60% |

As shown above, the packaging containers of Examples 1 to 11 exhibited satisfactory hygroscopic effects and ready release properties.

The following are examples and comparative examples, and evaluation results, for hygroscopic packaging containers which are hygroscopic packaging containers obtained by stacking two of the gas-barrier multilayer films of the invention with their heat-sealable layer surfaces together and heat sealing the peripheral parts, in which at least one of the heat-sealable layers of the two gas-barrier multilayer films is a hygroscopic heat-sealable layer.

Example 12

A hygroscopic gas-barrier multilayer film was produced similar to Example 1, having the multilayer structure: PET film/bonding agent/aluminum foil/bonding agent/hygroscopic heat sealable resin film.

Separately, a PET film (thickness: 12 μm, ESPET T4102, product of Toyobo, Ltd.), an aluminum foil (thickness: 9 μm, product of Toyo Aluminium, KK.) and an LLDPE film (RIKFILM L6100, product of Toyobo, Ltd.), were attached through a dry laminating bonding agent (RU004/H-1, product of Rock Paint Co., coating amount: 3.5 g/m² for each bonding layer, drying temperature: 70° C.), to produce a gas-barrier multilayer film without hygroscopicity, having the multilayer structure: PET film/bonding agent/aluminum foil/bonding agent/LLDPE film.

The obtained hygroscopic gas-barrier multilayer film and the gas-barrier multilayer film without hygroscopicity were stacked with the hygroscopic heat sealable resin film side and the LLDPE film side facing each other, and the peripheral edges were heat sealed under conditions of 160° C., 1 kgf/cm², 1 second, to produce a hygroscopic packaging container of the invention.

Example 13

A hygroscopic packaging container of the invention was produced in the same manner as Example 12, except that the hygroscopic heat sealable resin film used was a hygroscopic heat sealable resin film (DryKeep® SPES30-132J, product of Sasaki Chemical Co., Ltd.).

Example 14

A hygroscopic packaging container of the invention was produced in the same manner as Example 12, except that as the gas-barrier layer in the gas-barrier multilayer film without hygroscopicity, instead of a gas barrier film obtained by attaching an aluminum foil to a PET film, there was used a gas barrier film (IB-PET-RB, product of DaiNippon Printing Co., Ltd.) having a silicon oxide vapor deposition film (thickness: 10 nm) formed on a PET film (thickness: 12 μm) by chemical vapor deposition, with a gas-barrier coated film (thickness: 200 nm) further formed thereon, as a gas-barrier multilayer film having the multilayer structure: gas-barrier coated film/vapor deposition film/PET film/bonding agent/LLDPE film.

Example 15

A hygroscopic packaging container of the invention was produced in the same manner as Example 12, except that as the gas-barrier layers in the hygroscopic gas-barrier multilayer film and the gas-barrier multilayer film without hygroscopicity, instead of a gas barrier film obtained by attaching an aluminum foil to a PET film, there were used gas barrier films (IB-PET-RB, product of DaiNippon Printing Co., Ltd.) having a silicon oxide vapor deposition film (thickness: 10 nm) formed on a PET film (thickness: 12 μm) by chemical vapor deposition, with a gas-barrier coated film (thickness: 200 nm) further formed thereon, producing multilayer films having the multilayer structures: gas-barrier coated film/vapor deposition film/PET film/bonding agent/hygroscopic heat sealable resin film, and gas-barrier coated film/vapor deposition film/PET film/bonding agent/LLDPE film.

Example 16

A hygroscopic packaging container of the invention was produced in the same manner as Example 12, except that the hygroscopic heat sealable resin film produced in Example 12 was layered between the aluminum foil of the gas-barrier multilayer film without hygroscopicity and the LLDPE film via a dry laminating bonding agent, producing a multilayer film having the multilayer structure: PET film/bonding agent/aluminum foil/bonding agent/hygroscopic heat sealable resin film/bonding agent/LLDPE film.

Example 17

A hygroscopic packaging container of the invention was produced in the same manner as Example 15, except that the hygroscopic heat sealable resin film produced in Example 1 was layered between the PET film of the gas-barrier multilayer film without hygroscopicity and the LLDPE film via a dry laminating bonding agent, fabricating a multilayer film having the multilayer structure: gas-barrier coated film/vapor deposition film/PET film/bonding agent/bonding agent/hygroscopic heat sealable resin film/LLDPE film.

Example 18

A hygroscopic packaging container of the invention was produced in the same manner as Example 12, except that a hygroscopic heat sealable resin film (DryKeep® SPES30-111J, product of Sasaki Chemical Co., Ltd.) was used.

Example 19

A hygroscopic packaging container of the invention was produced by using two hygroscopic heat sealable resin films (DryKeep® SPES30-132J, product of Sasaki Chemical Co., Ltd.), preparing two multilayers of: PET film/bonding agent/aluminum foil/bonding agent/hygroscopic heat sealable resin film in the same manner as Example 12, stacking them with the hygroscopic heat-sealable layers facing each other, and heat sealing the peripheral edges under conditions of 160° C., 1 kgf/cm², 1 second.

Example 20

A hygroscopic packaging container of the invention was produced in the same manner as Example 12, except that a hygroscopic resin composition containing 50 mass % calcium oxide in a polyethylene resin (PERICON, product of Dainichiseika Color & Chemicals Mfg. Co., Ltd.), and LLDPE (ULTZEX 2022F, product of Prime Polymer Co., Ltd.) were co-extruded by an inflation method (extrusion temperature: 180° C.) to form a film, producing a hygroscopic heat sealable resin film with the structure: 10 μm LLDPE layer/30 μm hygroscopic resin composition layer (50 mass % calcium oxide)/10 μm LLDPE layer.

Example 21

A hygroscopic packaging container of the invention was produced in the same manner as Example 12, except that a hygroscopic resin composition containing 15 mass % calcium oxide in a polyethylene resin (PERICON, product of Dainichiseika Color & Chemicals Mfg. Co., Ltd.), and LLDPE (ULTZEX 2022F, product of Prime Polymer Co., Ltd.) were co-extruded by an inflation method (extrusion temperature: 180° C.) to form a film, producing a hygroscopic heat sealable resin film with the structure: 10 μm LLDPE layer/30 μm hygroscopic resin composition layer (15 mass % calcium oxide)/10 μm LLDPE layer.

Example 22

A hygroscopic packaging container of the invention was produced in the same manner as Example 12, except that a hygroscopic resin composition containing 35 mass % calcium oxide in a polyethylene resin (PERICON, product of Dainichiseika Color & Chemicals Mfg. Co., Ltd.), and LLDPE (ULTZEX 2022F, product of Prime Polymer Co., Ltd.) were co-extruded by an inflation method (extrusion temperature: 180° C.) to form a film, producing a hygroscopic heat sealable resin film with the structure: 10 μm LLDPE layer/30 μm hygroscopic resin composition layer (35 mass % calcium oxide)/10 μm LLDPE layer.

Example 23

A hygroscopic packaging container of the invention was produced in the same manner as Example 14, except that the hygroscopic heat sealable resin film used was a hygroscopic heat sealable resin film (DryKeep® SPES30-132J, product of Sasaki Chemical Co., Ltd.).

Comparative Example 2

A multilayer film and packaging container were produced in the same manner as Example 12, except that instead of attaching a hygroscopic heat sealable resin film, there was formed a heat-sealable layer comprising LLDPE containing no moisture absorbent (ULTZEX 2022F, product of Prime Polymer Co., Ltd.) (thickness: 50 μm).

<Hygroscopic Effect>

Pouch bags (120 mm×160 mm) were formed from the multilayer films prepared in Examples 12 to 23 and Comparative Example 2, an absorption hygrometer was placed in each pouch, and the relative humidity was measured after standing for 7 days. The evaluation results are shown in Table 2.

TABLE 2

| | Evaluation results | |
|---|---|---|
| | Relative humidity change | |
| | Initial | After 7 days |
| Example 12 | 60% | ≤5% |
| Example 13 | 60% | ≤5% |
| Example 14 | 60% | ≤5% |
| Example 15 | 60% | ≤5% |
| Example 16 | 60% | ≤5% |
| Example 17 | 60% | ≤5% |
| Example 18 | 60% | ≤5% |
| Example 19 | 60% | ≤5% |
| Example 20 | 60% | ≤5% |
| Example 21 | 60% | 10%-20% |
| Example 22 | 60% | ≤5% |
| Example 23 | 60% | ≤5% |
| Comp. Example 2 | 60% | 60% |

As shown above, the packaging containers of Examples 12 to 23 exhibited satisfactory hygroscopic effects and ready release properties.

EXPLANATION OF SYMBOLS

A. Hygroscopic multilayer film
B. Ready-release multilayer film
C. Gas-barrier multilayer film
D. Gas-barrier multilayer film
1.4. Gas-barrier layer
2. Heat-sealable layer
2a, 2c Heat sealable resin layers containing no moisture absorbent
2b Intermediate layer
3. Ready-release heat-sealable layer

The invention claimed is:
1. A hygroscopic packaging container for a blood glucose level measuring sensor, consisting of:
   a first film consisting of a first gas-barrier multilayer structure and a first heat-sealable layer; and
   a second film consisting of a second gas-barrier multilayer structure and a transparent second heat-sealable layer;
     wherein the first and second films are laminated to each other such that the first heat-sealable layer and the second heat-sealable layer are in contact with each other and are heat-sealed at peripheral portions thereof;
  the first heat-sealable layer consists of a first heat-sealable resin selected from the group consisting of low-density polyethylene and linear low-density polyethylene, and 1 to 50% by mass of calcium oxide, wherein the thickness of the first heat-sealable layer is from 50 to 200 μm,
  the second heat-sealable layer consists of (i) 70-90% by mass of a heat-sealable resin that is compatible with the first heat-sealable resin and defines a matrix of the second heat-sealable layer, and (ii) 10-30% by mass of a resin that is incompatible with the first heat-sealable resin and defines domains which are dispersed in the matrix, wherein the thickness of the second heat-sealable layer is 50 to 200 μm, wherein the second heat-sealable layer does not include any moisture absorbent compound;

the heat-sealable resin that is compatible with the first heat-sealable resin is selected from the group consisting of low-density polyethylene, linear low-density polyethylene, medium-density polyethylene, and high-density polyethylene; and the resin that is incompatible with the first heat-sealable resin is selected from the group consisting of polypropylene, polystyrene, and polybutene;

the first and second gas-barrier multilayer structures each consist of a resin layer, a vapor deposition layer formed on the resin layer, and a gas-barrier coated layer on the vapor deposition layer, wherein the gas-barrier coated layer is formed by coating and drying a gas-barrier composition on the vapor deposition layer, where the gas-barrier composition is obtained by a sol-gel method including hydrolysis and polycondensation of an alkoxide and a water-soluble polymer in the presence of a sol-gel catalyst, an acid, water, and an organic solvent other than water, wherein the alkoxide is represented by the formula $R^1{}_nM(OR^2)_m$, where $R^1$ and $R^2$ each represent a $C_1$-$C_8$ organic group; M represents an atom selected from the group consisting of silicon, zirconium, titanium, and aluminum; n is an integer of 0 or greater; and m is an integer of 1 or greater;

wherein the water-soluble polymer is at least one selected from the group consisting of polyvinyl alcohol and ethylene-vinyl alcohol copolymer;

wherein the thickness of the gas-barrier coated layer is about 200 nm; and wherein the gas-barrier composition optionally includes a silane coupling agent;

where the second gas-barrier multilayer structure is transparent, and the vapor deposition layer of the second gas-barrier multilayer structure is a silica deposited layer having a thickness of about 10 nm; and where the relative humidity inside the hygroscopic packaging container after it has been sealed for at least 7 days is greater than 0% and 5% or less.

2. A hygroscopic packaging container for a blood glucose level measuring sensor, consisting of:

a first film consisting of a first gas-barrier multilayer structure and a heat-sealable multilayer structure; and a second film consisting of a second gas-barrier multilayer structure and a transparent heat-sealable layer;

wherein the first and second films are laminated to each other such that the heat-sealable multilayer structure and the transparent heat-sealable layer are in contact with each other and are heat-sealed at peripheral portions thereof;

the heat-sealable multilayer structure consists of the following three layers:

(i) a first layer consisting of linear low-density polyethylene;

(ii) a second layer consisting of (a) one of low-density polyethylene and linear low-density polyethylene, and (b) 35 to 50% by mass of calcium oxide;

(iii) a third layer consisting of linear low-density polyethylene;

wherein the thickness of the heat-sealable multilayer structure is 50 to 80 μm, and wherein the second layer is interposed between the first layer and the third layer such that it is not in contact with the transparent heat-sealable layer of the second film;

the transparent heat-sealable layer consists of (i) 70-90% by mass of a heat-sealable resin that is compatible with linear low-density polyethylene and defines a matrix of the transparent heat-sealable layer, and (ii) 10-30% by mass of a resin that is incompatible with linear low-density polyethylene and defines domains which are dispersed in the matrix, wherein the thickness of the transparent heat-sealable layer is 50 to 200 μm, wherein the transparent heat-sealable layer does not include any moisture absorbent compound;

the heat-sealable resin that is compatible with linear low-density polyethylene is selected from the group consisting of low-density polyethylene, linear low-density polyethylene, medium-density polyethylene, and high-density polyethylene; and the resin that is incompatible with linear low-density polyethylene is selected from the group consisting of polypropylene, polystyrene, and polybutene;

the first and second gas-barrier multilayer structures each consist of a resin layer, a vapor deposition layer formed on the resin layer, and a gas-barrier coated layer on the vapor deposition layer, wherein the gas-barrier coated layer is formed by coating and drying a gas-barrier composition on the vapor deposition layer, where the gas-barrier composition is obtained by a sol-gel method including hydrolysis and polycondensation of an alkoxide and a water-soluble polymer in the presence of a sol-gel catalyst, an acid, water, and an organic solvent other than water, wherein the alkoxide is represented by the formula $R^1{}_nM(OR^2)_m$, where $R^1$ and $R^2$ each represent a $C_1$-$C_8$ organic group; M represents an atom selected from the group consisting of silicon, zirconium, titanium, and aluminum; n is an integer of 0 or greater; and m is an integer of 1 or greater;

wherein the water-soluble polymer is at least one selected from the group consisting of polyvinyl alcohol and ethylene-vinyl alcohol copolymer;

wherein the thickness of the gas-barrier coated layer is about 200 nm; and wherein the gas-barrier composition optionally includes a silane coupling agent;

where the second gas-barrier multilayer structure is transparent, and the vapor deposition layer of the second gas-barrier multilayer structure is a silica deposited layer having a thickness of about 10 nm; and where the relative humidity inside the hygroscopic packaging container after it has been sealed for at least 7 days is greater than 0% and 5% or less.

* * * * *